(12) United States Patent
Neudeck et al.

(10) Patent No.: US 8,431,185 B2
(45) Date of Patent: Apr. 30, 2013

(54) TEXTILE SURFACE STRUCTURE COMPRISING AN ARRANGEMENT OF A PLURALITY OF CONDUCTIVE THREADS OR THREADS EXHIBITING CONDUCTIVE PROPERTIES AND METHOD FOR THE PRODUCTION THEREOF

(75) Inventors: Andreas Neudeck, Reichenbach (DE); Hardy Müller, Hammerbrücke (DE); Wolfgang Scheibner, Schönberg (DE); Klaus Richter, Weimar (DE); Stephan Lenk, Weimar (DE)

(73) Assignee: Textilforschungsinstitut Thuringen-Vogtland, Greiz (DE)

( * ) Notice: Subject to any disclaimer, the term of this patent is extended or adjusted under 35 U.S.C. 154(b) by 1872 days.

(21) Appl. No.: 10/545,579

(22) PCT Filed: Feb. 16, 2004

(86) PCT No.: PCT/EP2004/001429
§ 371 (c)(1),
(2), (4) Date: Nov. 15, 2006

(87) PCT Pub. No.: WO2004/074401
PCT Pub. Date: Sep. 2, 2004

(65) Prior Publication Data
US 2008/0220678 A1   Sep. 11, 2008

(30) Foreign Application Priority Data

Feb. 18, 2003  (DE) .................................. 103 06 769
Jul. 24, 2003  (DE) .................................. 103 33 583

(51) Int. Cl.
*B05B 5/00*   (2006.01)
*B32B 5/02*   (2006.01)
*C09K 11/00*  (2006.01)

(52) U.S. Cl.
USPC .............................. 427/157; 442/110; 264/21

(58) Field of Classification Search ................... 427/157
See application file for complete search history.

(56) References Cited

U.S. PATENT DOCUMENTS

| 3,215,030 A | | 11/1965 | Jordan |
| 3,803,437 A | | 4/1974 | Robinson |
| 3,882,357 A | * | 5/1975 | Nieuweboer et al. ..... 315/209 R |
| 5,329,388 A | | 7/1994 | Yoshimizu |

(Continued)

FOREIGN PATENT DOCUMENTS

| DE | 199 34 436 A 1 | 1/2001 |
| DE | 19934436 A1 | 1/2001 |

(Continued)

*Primary Examiner* — James Lin
*Assistant Examiner* — Austin Murata
(74) *Attorney, Agent, or Firm* — Merchant & Gould P.C.

(57) ABSTRACT

The invention relates to a surface textile structure comprising an arrangement of a plurality of conductive threads or threads exhibiting conductive properties. Insulating sections are arranged between the conductive threads or insulating threads are incorporated into the structure. The structure also comprises an inorganic electroluminescent material and electric connection elements. According to the invention, the electroluminescent material is incorporated into intermediate areas of the structure or is embodied inside the structure in the form of coated threads. The structure is also provided with a coating which is also selective made of a fluorescent material and/or optical brightening agents. The overall arrangement comprises a transparent, elastic, covering protective layer.

6 Claims, 2 Drawing Sheets

U.S. PATENT DOCUMENTS

Figure 1:
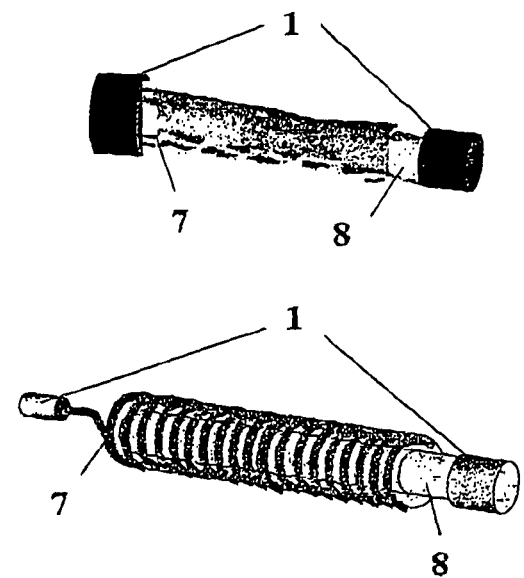

| | | |
|---|---|---|
| 5,674,437 A | 10/1997 | Geisel |
| 5,962,967 A * | 10/1999 | Kiryuschev et al. .......... 313/491 |
| 6,309,486 B1 * | 10/2001 | Kawaguchi et al. ............ 156/67 |
| 6,738,155 B1 | 5/2004 | Rosenlund et al. |
| 2001/0014174 A1 | 8/2001 | Yamamoto |
| 2002/0039666 A1 | 4/2002 | Nakamura |
| 2003/0119391 A1 * | 6/2003 | Swallow et al. ................. 442/6 |
| 2004/0109666 A1 * | 6/2004 | Kim, II ........................ 385/147 |
| 2005/0043848 A1 | 2/2005 | Wiechers |
| 2008/0233822 A1 * | 9/2008 | Swallow et al. .............. 442/185 |

FOREIGN PATENT DOCUMENTS

| | | |
|---|---|---|
| EP | 1 146 778 A2 | 10/2001 |
| JP | 7-301910 A | 11/1995 |
| RU | 2155461 * | 8/2000 |
| WO | WO 99/64657 | 12/1999 |
| WO | WO 01/19939 A1 | 3/2001 |

* cited by examiner

TEXTILE SURFACE STRUCTURE COMPRISING AN ARRANGEMENT OF A PLURALITY OF CONDUCTIVE THREADS OR THREADS EXHIBITING CONDUCTIVE PROPERTIES AND METHOD FOR THE PRODUCTION THEREOF

The invention relates to a textile surface structure comprising an arrangement of a plurality of conductive threads or threads exhibiting conductive properties, whereby insulating sections are arranged between the conductive threads or insulating threads are incorporated into the structure. The structure furthermore comprises an inorganic electroluminescent material and electric connection elements in accordance with the precharacterizing portion of claim 1 as well as a method for the production of such textile surface structures in accordance with the features of claim 17.

Electroluminescent arrangements and their use as light sources are known from prior art, e.g. EP 1 146 778 A2. Such arrangements comprise an electrode device and dielectric as well as electroluminescent layers. An outer essentially flexible layer forms an insulation and is comprised of a transparent material. The arrangement of a heating element allows for adapting the properties of the structure to different temperature conditions in order to maintain or increase their functional capability and/or luminous efficiency.

Likewise of the prior art are electroluminescent filaments in the form of fibers which are surrounded by an electrically-insulating dielectric layer and which additionally have a layer consisting of a material comprising electro-luminescent powder mixed with a bonding agent. The light source of the type described above is additionally surrounded by a transparent electrode.

The flexibility of such electroluminescent arrangements is limited and mandates that the outer surrounding electrode is to be configured of a transparent material.

The generic U.S. Pat. No. 3,803,437 patent specification shows an electroluminescent display arrangement consisting of a plurality of flexible wires or threads forming a textile surface structure.

Specifically, a plurality of parallel, flexible, insulating threads are interwoven with a plurality of flexible electrode fibers arranged in parallel, whereby a layer of an electroluminescent material is applied to the fiber structure thereby created such that the entire surface is covered. In one embodiment, the fibers acting as electrodes run substantially perpendicular to the insulating threads.

It has been shown, however, that the output of visible light is extremely small given such an embodiment of a textile surface structure having an inorganic electroluminescent layer. This is due to the coating material penetrating into the gaps between the fibers to thereby result in attenuation by shadow effect. If one were to now apply greater quantities of electro-luminescent material based on the prior art, this would result in the desired flexibility and typical haptics of a textile structure being lost.

Based on the above, it is thus the task of the invention to provide a more advanced textile surface structure from an arrangement of a plurality of conductive threads or threads exhibiting conductive properties, whereby insulating sections are arranged between the conductive threads, or insulating threads are incorporated into the structure, and whereby the structure is of an inorganic electroluminescent material. The structure to be thus created should exhibit the usual textile haptics and have high radiant energy efficiency and additionally be as resistant as possible to the usual environmental influences. At its most basic, the task of the invention consists of configuring the textile surface structure such that same can be integrated into a textile surface, respectively be produced with conventional textile manufacturing methods.

The task of the present invention is solved by a textile surface structure in accordance with the features of claim 1 as well as by a method for the production of such a surface structure as defined pursuant to claim 17, wherein the subclaims constitute no less than applicable embodiments and developments.

The invention thereby begins from an electroluminescent arrangement based on electroluminescent materials which are incorporated into the textile structure and which will illuminate given excitation alternating voltage and are excited by means of textile electrodes and/or electrodes integrated into the textile. In accordance with the invention, optical brightening agents and/or luminescent and/or phosphorescent substances or even also pigments to modify the emitted light in the visual spectral range are added to the electroluminescent materials.

It is an object of the invention that a textile surface structure will realize electroluminescent light sources of large dimensions and activatable displays with high efficiency and simple production. Due to its technologically simple manageability, the textile surface structure can be integrated into such consumer goods as textile materials for interior decoration, protective work clothes, advertising banners or other such similar commodities.

According to the invention, the electroluminescent material is incorporated into the intermediate areas of the thread structure or is embodied as coated threads arranged within the structure. Furthermore, the structure has a coating, also selective, of a fluorescent material and/or an optical brightening agent, whereby it is provided to supplement the overall arrangement with a transparent, elastic protective covering layer, to which however no electrical properties in the sense of an electrode are accorded.

The covering layer may consist of, for example, a polyurethane or acrylate or may comprise such a material.

The electric connection elements of the textile surface structure are formed directly on sections of same and can be realized by textile techniques such as stitching, for example.

Metallized threads, carbon fibers or threads coated with indium tin oxide can be used as the conductive textile substrate.

In a preferred embodiment of the present invention, two conductive threads of the structure are in each case configured at close spacing facing and insulated from one another, whereby electroluminescent material is incorporated into the intermediate area or a further thread having an electroluminescent coating or such electroluminescent properties is disposed in said intermediate area.

The close spacing ranges between 100 µm and 800 µm, whereby the diameter of a single thread is preferably within the range of 20 µm to 50 µm, up to a maximum of 500 µm.

The fluorescent substance, functioning in the sense of a light amplifier as it were, can also be provided with dyestuff in order to produce a multi-colored light source.

The fluorescent substance can be applied as an individual printed design, also partially or in sections, e.g. by means of silk-screen or ink jet printing, so as to realize fully customized images, structures or alphanumeric characters, which are then made luminous.

By means of multiple printing, it is possible to create a color matrix in additive or subtractive manner.

Using a pen, e.g. a fiber pen, to apply the fluorescent substance is also within the sense of the invention.

Pipings and gimps from differently coated and modified threads may comprise components of the textile surface structure.

As already indicated, the textile surface structure can be used in luminous safety textiles, fabric illuminants for interior decoration or as luminous textile advertising banners.

By design and arrangement of the conductive threads as well as the connection elements, it would be possible to create a display matrix having pixels able to be activated individually or by group.

In the method for producing a textile surface structure, textile techniques are used to first produce a pre-structure having adjacent insulated conductive threads. In a next step, electroluminescent paste is applied to the pre-structure, e.g. by spraying, which is at least partly absorbed by the fabric and thereby fixed at no detriment to the pre-structure's elastic properties and/or textile haptics.

The fluorescent substance is then applied to the pre-treated structure, followed by the applying of the covering protective layer.

In an alternative embodiment, the pre-structure can contain threads having an electroluminescent coating.

The possibility likewise exists of galvanically reinforcing the conductive threads of the pre-structure and/or subsequently treating same to this end.

The fluorescent substance can be incorporated into the pre-structure in the form of fluorescent threads or similar coated thread material without departing from the basic idea of the invention.

In a preferred embodiment of the invention, the pre-structure is realized as a double-comb structure, whereby conductive and non-conductive weft threads are inserted alternately, and to form the desired comb-like electrode structure and provide for its simple contact, conductive warp threads are threaded for outer laminar contact by alternating and excluding flotation on the left and right sides of the conductive weft threads.

All in all, the invention succeeds in providing a structure, the flexibility and mechanical resilience of which is superior to that of films. Furthermore, the properties of the textile material, such as its breathability, air permeability and other such properties, remain intact to the greatest extent, which is a priori not the case with films.

The electroluminescent light source thus created hence represents a textile surface which can be used as an independent material or affixed to substrate textiles as flexible sources of light. As far as transport, the flexible light source takes up only the smallest of space. The light source thus created has versatile uses in clothing as safety illumination when in traffic, as a fashionable accessory or, in the case of work clothes, can be coupled with sensors as a warning signal and/or display.

The surface structure produced by the method according to the invention can be readily sewn directly onto a textile base material or be mass-produced like conventional fabrics. The actual textile product, e.g. an item of clothing, interior linings for automobiles, a technical textile, etc., forms a unit together with the electroluminescent light source. The structure created is more mechanically resilient and, as previously mentioned, substantially more flexible than the structures known to date from films or so-called electroluminescent fibers (ELF) with diameters in the range of >2 mm.

The following will describe the invention in greater detail using the example of an embodiment as well as the figures.

Figure 2:
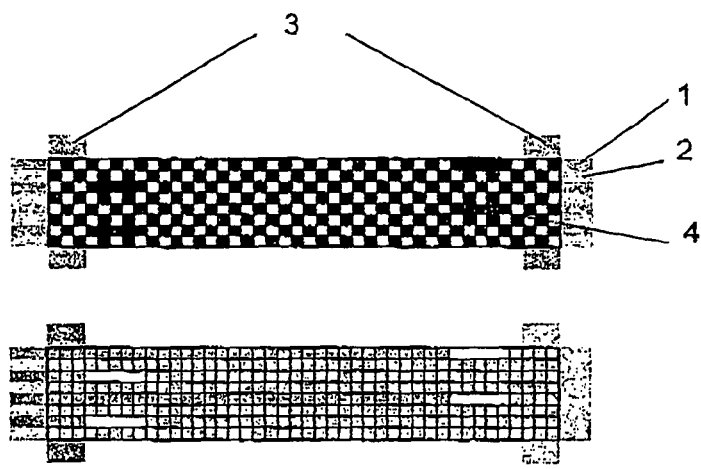
Figure 3:
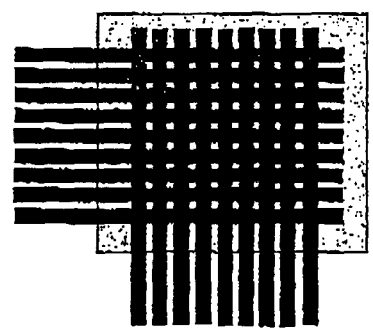
Figure 4:
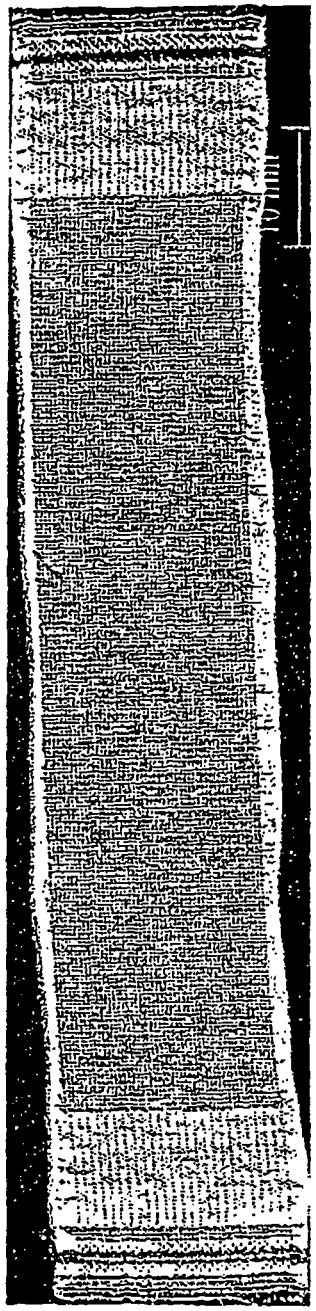
Figure 4:
Figure 4:
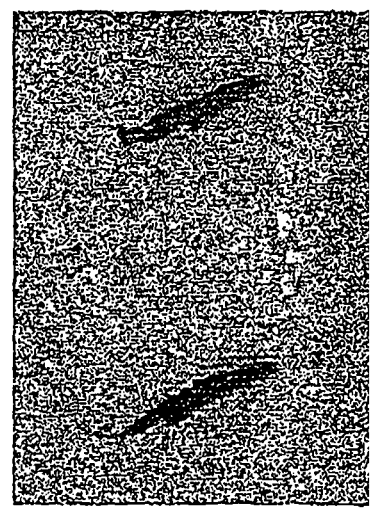
Figure 4:

Shown are:

FIG. 1 a conductive thread provided with a thin electroluminescent layer;

FIG. 2 an example of an electroluminescent textile surface structure;

FIG. 3 a basic representation showing the principle of a textile surface structure as a display matrix; and FIG. 4 illustrations of a realized electroluminescent textile structure
 a) in daylight without power supply connected,
 b) in daylight with power supply connected, and
 c) in a slightly darkened area, likewise with power supply connected.

FIG. 1 sets out from a conductive textile thread having a diameter of ideally 20 µm to 50 µm, with a maximum diameter of 500 µm, leading to outer electrodes 1. The coating is identified here by reference numeral 7 and the thread by reference numeral 8.

The electroluminescent textile surface structure according to FIG. 2 assumes alternatingly introduced conductive 1 and non-conductive 2 weft threads. Outer conductive warp threads 3 are threaded through for laminar contact.

The comb-like electrode structure is achieved by alternating and excluding left and right side flotation of the conductive weft threads in flotation region 4.

The basic representation according to FIG. 3 clearly shows how producing a multi-layer fabric, parts of which exhibit electrically conductive weft and warp threads insulated from one another by the fabric construction, provides for crossings of wefts and warps which are individually selectable and thus generate as it were points of light.

The laminar electroluminescent structure realized by the applicant pursuant to FIG. 4 starts from a fabric of metallized threads which was coated with an electroluminescent paste.

The textile surface was produced from 22 dTex thread material and is extraordinarily flexible. The electroluminescent paste is applied as a very thin preparation such that the textile properties remain even after sealing. The recognizable left and right-hand copper foil connections serve only for ease in handling during experimental tests and are not in principle necessary for the structure's actual functioning.

It was shown that using only electroluminescent pastes exclusively does not provide sufficient luminance since rather large losses of light occur when eschewing the usual optically transparent electrode layers customary to the art. As FIGS. 4b) and 4c) make clear, the use of fluorescent additives, which were applied here in the form of the TITV letter sequence, can intensify the luminous output, whereby intensities are attainable which correspond to those occurring in known electroluminescent films.

The transparent, preferably elastic covering layer over the entire arrangement exhibits electrically-insulating properties. In addition to insulating materials such as polyurethane or acrylate, polyvinyl chloride (PVC) is thus also conceivable hereto as a covering layer material.

The testing performed by the applicant showed that structures which consist of a thread-like material provided with micro-encapsulated doped zinc sulfide can be made to illuminate. Preferably, the fabric and threads used and/or the electrodes provided therein in accordance with the embodiment consist of galvanically gold-plated polyamide threads which had first been chemically silver-plated. Gold-plated threads have a positive impact on extending the life of modules produced in such fashion.

Luminous fabrics realized to date have web densities of between 60 $cm^{-1}$ to 70 $cm^{-1}$, which corresponds to a thread spacing of approximately 0.0167 cm to 0.143 cm. It was shown that also e.g. double-comb structures having electrode spacing of up to 800 µm can be successfully excited and made to illuminate. One positive aspect with such spacings is the fact that the excitation alternating voltage does not have to be increased.

In a further embodiment of the invention, luminous images of different colors can be produced by means of partial printing, e.g. by silk-screen printing on woven double-comb structures provided with electro-luminescent paste. If one uses differently colored pastes in this case, for example blue, green and orange, multi-color printing can result in colored luminous images being produced on the fabric structures. Given the appropriate excitation, the viewer's eye sees additive or subtractive compound colors which extends the chromatic spectrum for further applications.

It was shown in some cases that the paste-like electroluminescent substance to be applied had a negative impact on the textile processability of the thread materials. Here it is of advantage to incorporate non-coated double-thread electrodes into a textile surface by means of stitching and/or other textile techniques. The relevant luminescent effects can thereafter be achieved by subsequently imprinting the textile electrode surfaces thus produced from individual electrode threads provided with luminescent paste.

It is a further object of the invention to combine electroluminescence with luminescent materials in order to be able to increase the intensity of the light on the one hand as well as control the color of the emitted light on the other. A further embodiment makes use of fluorescent nanoparticles to this end. The color of the emitted fluorescent light is hereby a function of particle size and can be varied.

It is also of particular advantage to have the necessary voltage transformer, which transforms a low voltage, e.g. from a primary cell, into the necessary alternating voltage for the functioning of the arrangement, integrated directly into the textile material. It is particularly advantageous here to introduce the inevitably ensuing directly essential inductance, e.g. with transformer coils, into the fabric and/or to weave in the coils themselves.

The invention claimed is:

1. Method for the production of a textile surface structure from an arrangement of a plurality of conductive threads or threads exhibiting conductive properties, wherein insulating sections are arranged between the conductive threads or insulating threads are incorporated into the structure, with the structure comprising an inorganic electroluminescent material and electric connection elements, wherein said electroluminescent material is incorporated into the structure's intermediate areas or is embodied as coated threads arranged within the structure, with the structure being selectively provided with a coating of a fluorescent substance or optical brightening agents and wherein the overall arrangement comprises a transparent, elastic, covering protective layer, the method comprising:

producing a pre-structure exhibiting adjacent insulated conductive threads using textile techniques;

obtaining a double-comb structure alternately incorporating conductive and non-conductive weft threads, and inserting conductive warp threads for outer laminar contact and by alternating and excluding left and right side flotation of the conductive weft threads, forming a comb-like electrode structure to make contact with discrete electronic components;

applying electroluminescent paste to the pre-structure at least partly absorbed by the fabric and thereby fixed;

applying the fluorescent substance to the pre-treated structure; and applying the covering layer thereafter.

2. Method in accordance with claim 1, wherein the pre-structure contains threads exhibiting an electroluminescent coating.

3. Method in accordance with claim 1, wherein the conductive threads of the pre-structure are galvanically reinforced and pre-treated.

4. Method for the production of a textile surface structure from an arrangement of a plurality of conductive threads or threads exhibiting conductive properties, wherein insulating sections are arranged between the conductive threads or insulating threads are incorporated into the structure, with the structure comprising an inorganic electroluminescent material and electric connection elements, wherein said electroluminescent material is incorporated into the structure's intermediate areas or is embodied as coated threads arranged within the structure, with the structure being selectively provided with a coating of a fluorescent substance or optical brightening agents and wherein the overall arrangement comprises a transparent, elastic, covering protective layer, the method comprising:

producing a pre-structure exhibiting adjacent insulated conductive threads using textile techniques;

wherein a double-comb structure is obtained, wherein conductive and non-conductive weft threads are alternately incorporated, and conductive warp threads are furthermore inserted for outer laminar contact and by alternating and excluding left and right side flotation of the conductive weft threads, a comb-like electrode structure is formed to make contact with discrete electronic components;

applying electroluminescent paste to the pre-structure at least partly absorbed by the fabric and thereby fixed;

applying the fluorescent substance to the pre-treated structure;

wherein the fluorescent substance is incorporated into the pre-structure in the form of fluorescent threads or other coated threads; and applying the protective covering layer thereafter.

5. Method in accordance with claim 1, further comprising integrating an electronic device for the operation of the textile into the textile surface.

6. Method in accordance with claim 5, wherein the electronic device comprises a voltage transformer including transducer inductances woven into the textile surface.

* * * * *